(12) United States Patent
Surratt

(10) Patent No.: US 10,056,725 B1
(45) Date of Patent: Aug. 21, 2018

(54) THROTTLE BODY WIRE HARNESS ADAPTER

(71) Applicant: Darren L. Surratt, Burlington, NC (US)

(72) Inventor: Darren L. Surratt, Burlington, NC (US)

( * ) Notice: Subject to any disclaimer, the term of this patent is extended or adjusted under 35 U.S.C. 154(b) by 0 days.

(21) Appl. No.: 14/878,384

(22) Filed: Oct. 8, 2015

(51) Int. Cl.
*H01R 31/06* (2006.01)
*H01R 13/52* (2006.01)

(52) U.S. Cl.
CPC ......... *H01R 31/06* (2013.01); *H01R 13/5205* (2013.01)

(58) Field of Classification Search
None
See application file for complete search history.

(56) References Cited

U.S. PATENT DOCUMENTS

| 4,954,101 A * | 9/1990 | Nelson | H04L 29/06 439/502 |
| 6,906,261 B2 * | 6/2005 | Kondoh | B60R 16/0207 174/2 |

* cited by examiner

*Primary Examiner* — Dimary Lopez Cruz
(74) *Attorney, Agent, or Firm* — Tuggle Duggins P.A.; Blake Hurt

(57) ABSTRACT

A wire harness adapter for use with an automotive throttle body wire harness system, the wire harness adapter including six wires spanning between a pair of wire terminals positioned in different ones of a pair of connectors, one male and one female. Viewed from the connector side where the pins are inserted to contact the wire terminal ends, the female connector includes a wire orientation whereby the wires proceed in F, D, E, C, B, and A order relative to a conventional A, B, C, D, E, and F order. The opposing male connector includes a wire orientation of A, B, C, D, E, and F. In this manner, the novel wire harness adapter can be plugged into the vehicle's original wire harness via one connector, and into a separate electronic component such as an electronic throttle body via the other connector to permit customization and personalization of vehicle performance characteristics.

12 Claims, 3 Drawing Sheets

THROTTLE BODY WIRE HARNESS ADAPTER

FIELD OF THE INVENTION

The invention herein pertains to automotive performance accessories and particularly pertains to a wire harness adapter specifically configured to electronically communicate with a throttle body control unit for increased automotive performance.

DESCRIPTION OF THE PRIOR ART AND OBJECTIVES OF THE INVENTION

Gone are the days when pneumatics, levers, and cords were used to control the functions of an automobile. Presently, nearly all aspects of the modern car, van, truck, not to mention airplanes, motorcycles, and the like are governed by sophisticated electronic computing devices that are in electronic communication with everything from the air passing through the front of a vehicle to the emissions passing out the rear. These computing devices are commonly referred to generically, and collectively, as an electronic control unit (sometimes abbreviated as ECU) and may include one or more embedded computing device(s) such as an engine control module, a power train control module, a transmission control module, a brake control module, a console control module, a central timing module, a general electronics module, a body control module, a suspension control module, a door control module, a power steering module, a speed control module, a telematic control module, and a battery control module, among others. Modern vehicles may have upwards of eighty separate ECU modules, most with embedded software within a microcontroller that governs the operation of each ECU component.

If the ECU is the brain of the modern vehicle, the network of sensors and wires that run almost entirely throughout the vehicle are the nerves. These sensors measure vehicle speed, fluid temperature, torque force, tire pressure, throttle position, proximity of surrounding objects, exhaust oxygen, mass airflow, manifold pressure, engine temperature, curb detection, crankshaft position, and air-fuel ratio to name but a view variables, and communicate these data to the ECU, most commonly via wires. Given the logistical challenges of routing such a high number of wires throughout a vehicle, and further in an attempt to protect these informational lifelines, it is not uncommon to route a series of these wires through a single conduit or an integrated orientation of wires, sometimes referred to as a wire harness. A wire harness typically includes plugs, be they male or female, installed at either end, permitting quick and convenient electrical connection between signal generation and signal computation. However, despite the variety of wire harness configurations known in the prior art, the wire harness is generally known to be an accumulation device, that is to say, it collects numerous wires into a spatially small space, potentially adheres them together, but does nothing to attempt to re-orient the wire organization, and therefore does not affect the information traveling therein. It has recently been learned that by re-configuring the wire layout, better vehicle performance characteristics may be achieved. Therefore, there exists a need for an adapter wire harness that can be installed without significant technical expertise or equipment and positively affect vehicle performance.

Thus, in view of the problems and disadvantages associated with prior art wiring devices, the present invention was conceived and one of its objectives is to provide a wire harness adapter that can be installed quickly and easily.

It is another objective of the present invention to provide a wire harness adapter including a 7283-8850-30 connector and a 7282-8850-30 connector.

It is still another objective of the present invention to provide a wire harness adapter with a 7283-8850-30 connector with wire leads designated F, D, E, C, B, and A (left to right, wire side) mated to a replacement throttle body attachment with corresponding wire connections, compared to the prior art 7283-8850-30 connector with wire leads designated A, B, C, D, E, and F (left to right, wire side) mated to a stock throttle body attachment with the conventional wire configuration.

It is yet another objective of the present invention to provide a wire harness adapter with a 7282-8850-30 connector and at least two wires crossing from the opposing end, resulting in wire leads oriented F, E, D, C, B, and A (left to right, wire side) mated to a stock wire harness with corresponding wire leads, compared to the prior art connector 7282-8850-30 connector with wire leads designated F, E, D, C, B, and A (left to right, wire side) mated to a stock wire harness with wire leads as conventional.

It is a further objective of the present invention to provide a wire harness adapter with a 7283-8850-30 connector including 7116-4415-02, 7116-4416-02, or 7116-4417-02 terminals.

It is still a further objective of the present invention to provide a wire harness adapter with a 7282-8850-30 connector including 7114-4415-02, 7114-4416-02, or 7116-4417-02 terminals.

It is yet a further objective of the present invention to provide a wire harness adapter with a 7283-8850-30 connector and a 7282-8850-30 connector each including 7158-3165-90, 7158-3166-60, 7158-3167-80, or 7158-3168-80 wire seals.

Various other objectives and advantages of the present invention will become apparent to those skilled in the art as a more detailed description is set forth below.

SUMMARY OF THE INVENTION

The aforesaid and other objectives are realized by providing a wire harness adapter intended for use with an automotive throttle body manufactured by Hitachi and conventional wire harness system, the wire harness adapter includes six wires spanning between a pair of wire terminals positioned in different ones of a pair of connectors, one male and one female. Viewed from the wire side where the pins are inserted to contact the wire terminal ends and proceeding from left to right, the female connector includes a wire orientation whereby the wires proceed in F, D, E, C, B, and A order (compared to the standard A, B, C, D, E, and F). The opposing male connector includes a wire orientation whereby the E and D wires swap locations, producing a wire orientation of F, E, D, C, B, and A when viewed from the wire side, proceeding left to right. In this manner, the novel wire harness adapter can be plugged into the vehicle's original wire harness via one connector, and into a separate component such as an aftermarket throttle body via the other connector. This orientation allows for previously unavailable modification of the vehicle's electronic control systems, permitting greater customization and enhanced performance incorporating the new throttle body.

DETAILED DESCRIPTION OF THE PREFERRED EMBODIMENT AND OPERATION OF THE INVENTION

Figure 1:
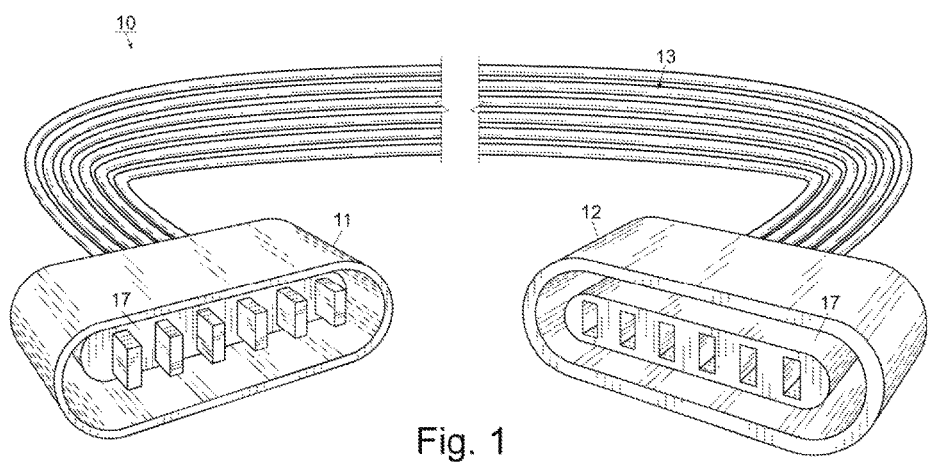
FIG. 1 shows an elevated perspective view of a throttle body adapter harness.

For a better understanding of the invention and its operation, turning now to the drawings, FIG. 1 illustrates a perspective view of preferred throttle body wire harness adapter 10 including male connector end 11, female connector end 12, and a plurality of wires 13 of indeterminate length extending therebetween. While it should be understood that the instant invention contemplates embodiments that include any number of wires 13, the preferred embodiment of wire harness adapter 10 deploys six (6) wires 13, the justification for which will be explained in further detail below.

In this day and age, most vehicles have become almost entirely controlled by electronic signals sent and received by one or more onboard computers. From boats to planes to cars to trucks, numerous electronic inputs are sensed, detected, or otherwise received from a host of sensors deployed about the vehicle and transmitted to one or more central electronic computing units (ECUs). The means may vary from vehicle to vehicle, but one primary source of signal transmission is conventionally known as the engine wire harness. A wire harness is a complicated assemblage of cables, wires, connectors and grommets surrounded by insulation. It typically is installed between static and moving vehicle body parts, and may carry electronic impulse signals from doors, lift gates, hoods, trunk lids, steering wheels, gas pedals, and the like. For example, FIG. 2 demonstrates a schematic representation of throttle body wire harness adapter 10 in communication with ECU 16 via sensor 15 and transmitting the electronic input signals therefrom to throttle body 14. Preferred throttle body 14 is commercially available from Hitachi, and more preferably is selected from a group comprising serial numbers ETB0014, ETB0021, and ETB0005. It should be clear by FIG. 2 and the accompanying description that the representations of throttle body 14, sensor 15 and ECU 16 are not intended to be limiting and instead should be construed broadly to encompass all identical and similar structures as are known in the art.

As used herein, male connector 11 is preferably a six wire, polymeric connector housing commercially available from Yazaki Connectors, Part No. 7282-8850-30, and may be referred to herein as a 7282-8850-30 connector. Similarly, female connector is preferably a six wire, polymeric connector housing commercially available from Yazaki Connectors, Part No. 7283-8850-30, and may be referred to herein as a 7283-8850-30 connector. Positioned within each male connector 11 and female connector 12 may be a structure known as a terminal block or simply terminal 17 which is a convenient means of connecting individual electrical wires without a splice or physically joining the ends. Preferred terminal 17 is matched from the specific variables embodied in male connector 11 and female connector 12 and may be selected from the group consisting of copper alloy, tin plated terminals available from Yazaki Connectors, Part Nos. 7116-4115-02, 7116-4116-02, and 7116-4117-02, and may be referred to herein as 7116-4115-02, 7116-4116-02, and 7116-4117-02 terminals, respectively. Each wire 13 runs into a separate port of terminal 17 that facilitates the transmission of signal transduction through wire adapter harness 10. Although not shown, each wire 13 and associated port of terminal 17 preferably further includes a silicon wire seal to frictionally engage male connector 11 or female connector 12 and ensure a tight and secure engagement therewith. The preferred wire seal is selected from the group comprising seals available from Yazaki Connectors, Part Nos. 7158-3165-90, 7158-3166-60, 7158-3167-80, and 7158-3168-80, and may be referred to herein as 7158-3165-90, 7158-3166-60, 7158-3167-80, and 7158-3168-80 seals.

Figure 2:
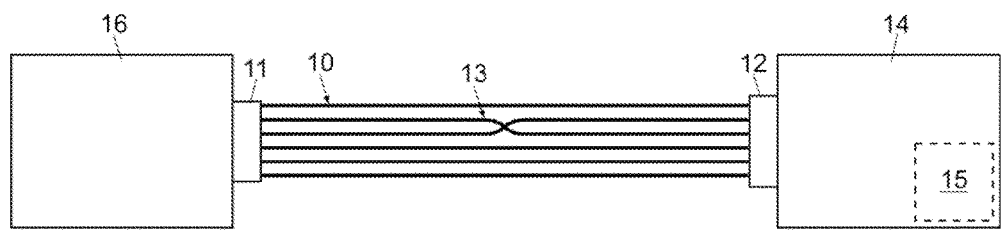
FIG. 2 pictures a schematic representation of the adapter harness of FIG. 1.

The prior art is replete with examples of wire harnesses in which each wire 13 enters a first connector, extends some predetermined length and then enters and exits a second connector in the same position or orientation. However, in an effort to permit customization as well as the ability to modify certain limitations programmed and enforced by ECU 16, it may be desirous to alter the configuration of wires 13 from their position in the first connector relative to the second connector. Preferred throttle body wire adapter harness 10 as seen in FIGS. 2 and 3A accomplishes this novel configuration by altering the orientation of wires 13 between the terminal ends of male connector 11 and female connector 12.

Figure 3:
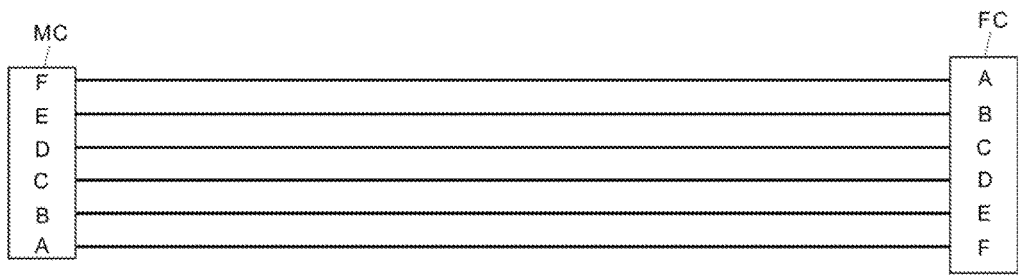
FIG. 3 illustrates a conventional wiring schematic of a prior art wire harness.

For the sake of clarity, wires 13 are designated F, E, D, C, B, and A as they are viewed from right to left (top to bottom as presented in FIG. 3) from the "wire side" of male connector MC and wires 13 are designated A, B, C, D, E, and F as they are viewed from left to right (top to bottom as presented in FIG. 3) from the "wire side" of female connector FC as illustrated in FIG. 3. Given that FIG. 3 shows the conventional wire configuration, it should come as no surprise that each wire 13 extends from male connector MC to female connector FC without any deviation, such that MC designation F matches with FC designation A, MC designation E matches with FC designation B, and so forth.

Figure 3A:
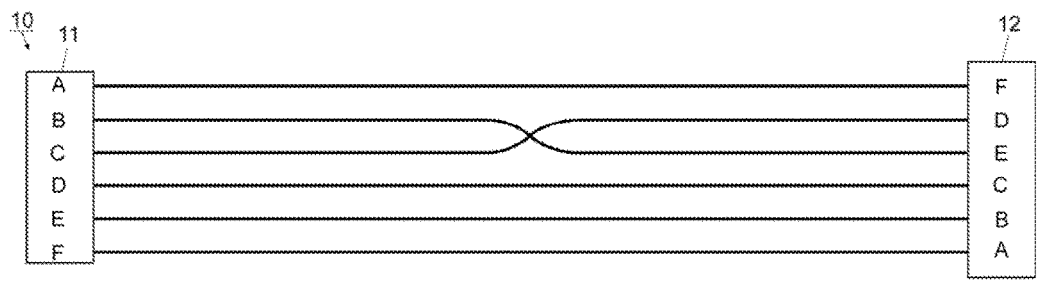
FIG. 3A depicts a wiring schematic of the adapter harness of FIG. 1.

By comparison, wires 13 in preferred throttle body wire adapter harness 10 shown in FIG. 3A when viewed from the "wire side" of male connector 11 are designated A, B, C, D, E, and F as they are viewed from right to left (top to bottom as presented in FIG. 3A) and wires 13 when viewed from the "wire side" of female connector 12 are designated as F, D, E, C, B, and A as they are viewed from left to right (top to bottom as presented in FIG. 3A). As noted in FIG. 3A, wires 13 each extend directly from designations A, D, E and F of male connector 11 to respective designations F, C, B, and A of female connector 12 without any substantive deviation, although their positioning is reversed in the sense that wire 13 from designation A (of 11) extends to designation F (of 12). When compared to the conventional orientation in FIG. 3, wires 13 designated as A, B, and C of male connector MC, are in the respective positions of F, E, and D of female connector FC.

Uniquely as seen in FIG. 3A, wires 13 at designations B and C of male connector 11 exit and swap places in relation to their respective orientation as defined at male connector 11 to be received at designations E and D of female connector 12 respectively, resulting in an orientation that begins as designations A, B, C, D, E, and F at male connector 11, but ends as designations F, D, E, C, B, and A at female connector 12 when considered from the wire side (left to right). Overall, the pairings when considered as a whole from male connector 11 to female connector 12 would be A:F, B:E, C:D, D:C, E:B, and F:A. In an exemplary vehicle (not shown), wires 13 A-F may have numerous functionality as described above, for example throttle control motor (open), throttle control motor (closed), sensor (ground), throttle (position 1), throttle (position 2), a sensor power supply (5 volts). In the exemplary vehicle (assuming the above functions correspond with wires 13 A-F), the novel wire 13 orientation would advantageously result in a change of the position of every wire 13. It should be understood that the above demonstration of the preferred embodiment of throttle body wire adapter harness 10 should be construed to cover other embodiments of wire adapter harnesses, and the functionality of wires 13 should not be considered limiting on the instant invention. Wires 13 are presented in FIG. 3A in solid fashion to indicate that an embodiment of wire adapter harness 10 includes wires 13 that cross outside or external one of connectors 11, 12, but an alternate embodiment of wire adapter harness 10 may utilize the exact same position reversal, but which takes place within the housing of at least one of connectors 11, 12. Both embodiments are intended to fall within the scope of the instant invention.

In use, throttle body wire adapter harness 10 can be installed quickly and easily by even the most novice mechanic, allowing for customization and performance increases without timely and costly trips to the repair garage. The illustrations and examples provided herein are for explanatory purposes and are not intended to limit the scope of the appended claims.

I claim:

1. A wire harness defining first and second connectors affixed at opposing ends of a group of six wires, a predetermined sequential orientation at the first connector (12) defined as a first position F, a second position D, a third position E, a fourth position C, a fifth position B and a six position A and a predetermined sequential orientation at the second connector (11) defined as a first position A, a second position B, a third position C, a fourth position D, a fifth position E and a sixth position F, the first wire defining first and second opposing ends, the first wire first end attached at the first position F at the first connector and the first wire second end attached at the first position A at the second connector, the second wire defining first and second opposing ends, the second wire first end attached at the second position D at the first connector and the second wire second end attached at the third position C at the second connector, the third wire defining first and second opposing ends, the third wire first end attached at the third position E at the first connector and the third wire second end attached at the second position B at the second connector, a fourth wire defining first and second opposing ends, the fourth wire first end attached at the fourth position C at the first connector and the fourth wire second end attached at the fourth position D at the second connector, a fifth wire defining first and second opposing ends, the fifth wire first end attached at the fifth position B at the first connector and the fifth wire second end attached at the fifth position E at the second connector, and a sixth wire defining first and second opposing ends, the sixth wire first end attached at the sixth position A at the first connector and the sixth wire second end attached at a sixth position F at the second connector, whereby the second and third wires extend from the first connector to the second connector, the second and third wires crossing between said first and second connectors.

2. The wire harness of claim 1 whereby the first connector is a 7282-8850-30 connector.

3. The wire harness of claim 1 whereby the second connector is a 7283-8850-30 connector.

4. The wire harness of claim 1 further comprising a terminal positioned within each of the first and second connectors.

5. The wire harness of claim 4 further comprising a terminal selected from the group consisting of 7116-4115-02, 7116-4116-02, and 7116-4117-02 terminals.

6. The wire harness of claim 1 further comprising a wire seal engaged with each of the plurality of wires.

7. The wire harness of claim 6 further comprising a wire seal selected from the group consisting of 7158-3165-90, 7158-3166-60, 7158-3167-80, and 7158-3168-80 wire seals.

8. The wire harness of claim 1 whereby the first connector is defined as a female connector and the second connector is defined as a male connector.

9. The wire harness of claim 8 whereby the group of six wires are defined by functionality of a power supply sensor, grounding a sensor, and control of a throttle motor, or determining a throttle position.

10. A wire harness for an automobile defining first and second connectors affixed at opposing ends of a group of six wires, the first connector defined as a 7282-8850-30 connector, the second connector defined as a 7283-8850-30 connector, a terminal positioned within each of the first and second connectors, the terminal selected from the group consisting of 7116-4115-02, 7116-4116-02, and 7116-4117-02 terminals, a wire seal engaged with each of the plurality of wires, the wire seal selected from the group consisting of 7158-3165-90, 7158-3166-60, 7158-3167-80, and 7158-3168-80 wire seals, and a predetermined sequential orientation at the first connector (12) defined as a first position F, a second position D, a third position E, a fourth position C, a fifth position B and a six position A and a predetermined sequential orientation at the second connector (11) defined as a first position A, a second position B, a third position C, a fourth position D, a fifth position E and a sixth position F, the first wire defining first and second opposing ends, the first wire first end attached at the first position F at the first connector and the first wire second end attached at the first position A at the second connector, the second wire defining first and second opposing ends, the second wire first end attached at the second position D at the first connector and the second wire second end attached at the third position C at the second connector, the third wire defining first and second opposing ends, the third wire first end attached at the third position E at the first connector and the third wire second end attached at the second position B at the second connector, a fourth wire defining first and second opposing ends, the fourth wire first end attached at the fourth position C at the first connector and the fourth wire second end attached at the fourth position D at the second connector, a fifth wire defining first and second opposing ends, the fifth wire first end attached at the fifth position B at the first connector and the fifth wire second end attached at the fifth position E at the second connector, and a sixth wire defining first and second opposing ends, the sixth wire first end attached at the sixth position A at the first connector and the sixth wire second end attached at the sixth position F at the second connector, whereby the second and third wires extend from the first connector to the second connector, the second and third wires crossing between said first and second connectors.

11. The wire harness of claim 10 whereby the first connector is defined as a female connector and the second connector is defined as a male connector.

12. The wire harness of claim 10 whereby the group of six wires are defined by functionality related to a power supply sensor, grounding a sensor, and control of a throttle motor, or determining a throttle position.

* * * * *